United States Patent
Chen

(10) Patent No.: US 10,123,315 B2
(45) Date of Patent: Nov. 6, 2018

(54) METHOD AND APPARATUS FOR ENHANCING CHANNEL CAPACITY AND SPECTRAL EFFICIENCY IN A WIRELESS COMMUNICATION SYSTEM

(71) Applicant: ASUSTeK Computer Inc., Taipei (TW)

(72) Inventor: I-Jen Chen, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 163 days.

(21) Appl. No.: 14/880,722

(22) Filed: Oct. 12, 2015

(65) Prior Publication Data

US 2016/0112995 A1    Apr. 21, 2016

Related U.S. Application Data

(60) Provisional application No. 62/064,095, filed on Oct. 15, 2014, provisional application No. 62/072,007, filed on Oct. 29, 2014.

(51) Int. Cl.
*H04J 11/00* (2006.01)
*H04W 72/04* (2009.01)
(Continued)

(52) U.S. Cl.
CPC .......... *H04W 72/042* (2013.01); *H04L 27/02* (2013.01); *H04L 27/3461* (2013.01);
(Continued)

(58) Field of Classification Search
None
See application file for complete search history.

(56) References Cited

U.S. PATENT DOCUMENTS

| 2003/0212946 A1 | 11/2003 | Kroeger |
| 2006/0203713 A1* | 9/2006 | Laroia ............... H04L 5/023 370/209 |

(Continued)

FOREIGN PATENT DOCUMENTS

| CN | 101238655 | 3/2006 |
| JP | 2013-239777 | 11/2013 |
| KR | 10-2004-0111571 | 12/2004 |

OTHER PUBLICATIONS

Office Action from the Korean Intellectual Property Office in the corresponding Korean Application No. 10-2015-0143300, dated Dec. 1, 2016.

(Continued)

*Primary Examiner* — Edan Orgad
*Assistant Examiner* — Sithu Ko
(74) *Attorney, Agent, or Firm* — Blue Captial Law Firm, P.C.

(57) ABSTRACT

A method and apparatus of a UE are disclosed. In one embodiment, the method includes the UE receiving a superposed signal from a BS. The method also includes the UE receiving a signaling from the BS and getting information from the signaling about a first standard modulation scheme for demodulation and a specific indication of how to retrieve at least one transport block from the demodulation output. In addition, the method includes the UE demodulating the superposed signal received from the BS according to the first standard modulation scheme, retrieving at least one transport block from the demodulation output according to the specific indication, and ignoring other portion(s) of the demodulation output.

14 Claims, 19 Drawing Sheets

(51) Int. Cl.
*H04W 76/27* (2018.01)
*H04L 27/34* (2006.01)
*H04L 27/02* (2006.01)
*H04W 88/02* (2009.01)
*H04W 88/08* (2009.01)

(52) U.S. Cl.
CPC ......... *H04L 27/3488* (2013.01); *H04W 76/27* (2018.02); *H04W 88/02* (2013.01); *H04W 88/08* (2013.01)

(56) References Cited

U.S. PATENT DOCUMENTS

| | | | |
|---|---|---|---|
| 2010/0232348 A1* | 9/2010 | Wu | H04L 1/0003 370/315 |
| 2014/0044094 A1 | 2/2014 | Vijayan et al. | |
| 2014/0086160 A1* | 3/2014 | Kim | H04L 1/00 370/329 |

OTHER PUBLICATIONS

Office Action from the Taiwan Intellectual Patent Office in the corresponding Taiwan Application No. 104133581, dated Nov. 17, 2016.

Office Action from corresponding Korean Application No. 10-2015-014330, dated Jun. 9, 2017.

Alberto G Perotti et al: "Non-Orthogonal Multiple Access for Degraded Broadcast Channels: RA-CEMA", Oct. 21, 2014 (Oct. 21, 2014), XP055153896, Retrieved from the Internet: URL:http://arxiv.org/abs/1410.5579 [retrieved on Feb. 9, 2016] *Section III *.

Alberto G Perotti et al: "Non-Orthogonal multiple access for degraded broadcast channels: RA-CEMA", 2015 IEEE Wireless Communications and Networking Conference (WCNC),Mar. 1, 2015 (Mar. 1, 2015), pp. 735-740, XP055248467,DOI:10.1109/WCNC.2015.7127561 ISBN: 978-1-4799-8406-0 *Section III*.

Perotti Alberto G et al: "Downlink overloaded multiple access based on constellation expansion1", 2014 IEEE Globecom Workshops (GC WKSHPS), IEEE, Dec. 8, 2014 (Dec. 8, 2014), pp. 977-982, XP032747912, DOI: 10.1109/GLOCOMW.2014.7063560 *Section II *.

European Search Report from corresponding European Application No. 15189882.2, dated Jul. 7, 2016.

Office Action from corresponding JP Patent Application No. 2015-203698, dated Oct. 4, 2016.

Office Action from SIPO in corresponding CN Application No. 20151666407, dated Apr. 27, 2018.

* cited by examiner

| $b(i), b(i+1)$ | I | Q |
|---|---|---|
| 00 | $1/\sqrt{2}$ | $1/\sqrt{2}$ |
| 01 | $1/\sqrt{2}$ | $-1/\sqrt{2}$ |
| 10 | $-1/\sqrt{2}$ | $1/\sqrt{2}$ |
| 11 | $-1/\sqrt{2}$ | $-1/\sqrt{2}$ |

FIG. 8 (PRIOR ART)

| $b(i),b(i+1),b(i+2),b(i+3)$ | $I$ | $Q$ |
|---|---|---|
| 0000 | $1/\sqrt{10}$ | $1/\sqrt{10}$ |
| 0001 | $1/\sqrt{10}$ | $3/\sqrt{10}$ |
| 0010 | $3/\sqrt{10}$ | $1/\sqrt{10}$ |
| 0011 | $3/\sqrt{10}$ | $3/\sqrt{10}$ |
| 0100 | $1/\sqrt{10}$ | $-1/\sqrt{10}$ |
| 0101 | $1/\sqrt{10}$ | $-3/\sqrt{10}$ |
| 0110 | $3/\sqrt{10}$ | $-1/\sqrt{10}$ |
| 0111 | $3/\sqrt{10}$ | $-3/\sqrt{10}$ |
| 1000 | $-1/\sqrt{10}$ | $1/\sqrt{10}$ |
| 1001 | $-1/\sqrt{10}$ | $3/\sqrt{10}$ |
| 1010 | $-3/\sqrt{10}$ | $1/\sqrt{10}$ |
| 1011 | $-3/\sqrt{10}$ | $3/\sqrt{10}$ |
| 1100 | $-1/\sqrt{10}$ | $-1/\sqrt{10}$ |
| 1101 | $-1/\sqrt{10}$ | $-3/\sqrt{10}$ |
| 1110 | $-3/\sqrt{10}$ | $-1/\sqrt{10}$ |
| 1111 | $-3/\sqrt{10}$ | $-3/\sqrt{10}$ |

FIG. 9 (PRIOR ART)

| b(i)b(i+1)b(i+2)b(i+3)b(i+4)b(i+5) | I | Q | b(i)b(i+1)b(i+2)b(i+3)b(i+4)b(i+5) | I | Q |
|---|---|---|---|---|---|
| 000000 | $3/\sqrt{42}$ | $3/\sqrt{42}$ | 100000 | $-3/\sqrt{42}$ | $3/\sqrt{42}$ |
| 000001 | $3/\sqrt{42}$ | $1/\sqrt{42}$ | 100001 | $-3/\sqrt{42}$ | $1/\sqrt{42}$ |
| 000010 | $1/\sqrt{42}$ | $3/\sqrt{42}$ | 100010 | $-1/\sqrt{42}$ | $3/\sqrt{42}$ |
| 000011 | $1/\sqrt{42}$ | $1/\sqrt{42}$ | 100011 | $-1/\sqrt{42}$ | $1/\sqrt{42}$ |
| 000100 | $3/\sqrt{42}$ | $5/\sqrt{42}$ | 100100 | $-3/\sqrt{42}$ | $5/\sqrt{42}$ |
| 000101 | $3/\sqrt{42}$ | $7/\sqrt{42}$ | 100101 | $-3/\sqrt{42}$ | $7/\sqrt{42}$ |
| 000110 | $1/\sqrt{42}$ | $5/\sqrt{42}$ | 100110 | $-1/\sqrt{42}$ | $5/\sqrt{42}$ |
| 000111 | $1/\sqrt{42}$ | $7/\sqrt{42}$ | 100111 | $-1/\sqrt{42}$ | $7/\sqrt{42}$ |
| 001000 | $5/\sqrt{42}$ | $3/\sqrt{42}$ | 101000 | $-5/\sqrt{42}$ | $3/\sqrt{42}$ |
| 001001 | $5/\sqrt{42}$ | $1/\sqrt{42}$ | 101001 | $-5/\sqrt{42}$ | $1/\sqrt{42}$ |
| 001010 | $7/\sqrt{42}$ | $3/\sqrt{42}$ | 101010 | $-7/\sqrt{42}$ | $3/\sqrt{42}$ |
| 001011 | $7/\sqrt{42}$ | $1/\sqrt{42}$ | 101011 | $-7/\sqrt{42}$ | $1/\sqrt{42}$ |
| 001100 | $5/\sqrt{42}$ | $5/\sqrt{42}$ | 101100 | $-5/\sqrt{42}$ | $5/\sqrt{42}$ |
| 001101 | $5/\sqrt{42}$ | $7/\sqrt{42}$ | 101101 | $-5/\sqrt{42}$ | $7/\sqrt{42}$ |
| 001110 | $7/\sqrt{42}$ | $5/\sqrt{42}$ | 101110 | $-7/\sqrt{42}$ | $5/\sqrt{42}$ |
| 001111 | $7/\sqrt{42}$ | $7/\sqrt{42}$ | 101111 | $-7/\sqrt{42}$ | $7/\sqrt{42}$ |
| 010000 | $3/\sqrt{42}$ | $-3/\sqrt{42}$ | 110000 | $-3/\sqrt{42}$ | $-3/\sqrt{42}$ |
| 010001 | $3/\sqrt{42}$ | $-1/\sqrt{42}$ | 110001 | $-3/\sqrt{42}$ | $-1/\sqrt{42}$ |
| 010010 | $1/\sqrt{42}$ | $-3/\sqrt{42}$ | 110010 | $-1/\sqrt{42}$ | $-3/\sqrt{42}$ |
| 010011 | $1/\sqrt{42}$ | $-1/\sqrt{42}$ | 110011 | $-1/\sqrt{42}$ | $-1/\sqrt{42}$ |
| 010100 | $3/\sqrt{42}$ | $-5/\sqrt{42}$ | 110100 | $-3/\sqrt{42}$ | $-5/\sqrt{42}$ |
| 010101 | $3/\sqrt{42}$ | $-7/\sqrt{42}$ | 110101 | $-3/\sqrt{42}$ | $-7/\sqrt{42}$ |
| 010110 | $1/\sqrt{42}$ | $-5/\sqrt{42}$ | 110110 | $-1/\sqrt{42}$ | $-5/\sqrt{42}$ |
| 010111 | $1/\sqrt{42}$ | $-7/\sqrt{42}$ | 110111 | $-1/\sqrt{42}$ | $-7/\sqrt{42}$ |
| 011000 | $5/\sqrt{42}$ | $-3/\sqrt{42}$ | 111000 | $-5/\sqrt{42}$ | $-3/\sqrt{42}$ |
| 011001 | $5/\sqrt{42}$ | $-1/\sqrt{42}$ | 111001 | $-5/\sqrt{42}$ | $-1/\sqrt{42}$ |
| 011010 | $7/\sqrt{42}$ | $-3/\sqrt{42}$ | 111010 | $-7/\sqrt{42}$ | $-3/\sqrt{42}$ |
| 011011 | $7/\sqrt{42}$ | $-1/\sqrt{42}$ | 111011 | $-7/\sqrt{42}$ | $-1/\sqrt{42}$ |
| 011100 | $5/\sqrt{42}$ | $-5/\sqrt{42}$ | 111100 | $-5/\sqrt{42}$ | $-5/\sqrt{42}$ |
| 011101 | $5/\sqrt{42}$ | $-7/\sqrt{42}$ | 111101 | $-5/\sqrt{42}$ | $-7/\sqrt{42}$ |
| 011110 | $7/\sqrt{42}$ | $-5/\sqrt{42}$ | 111110 | $-7/\sqrt{42}$ | $-5/\sqrt{42}$ |
| 011111 | $7/\sqrt{42}$ | $-7/\sqrt{42}$ | 111111 | $-7/\sqrt{42}$ | $-7/\sqrt{42}$ |

FIG. 10 (PRIOR ART)

| $b(i),b(i+1),b(i+2),b(i+3)$ | I | Q |
|---|---|---|
| 0000 | $2/\sqrt{20}$ | $2/\sqrt{20}$ |
| 0001 | $2/\sqrt{20}$ | $4/\sqrt{20}$ |
| 0010 | $4/\sqrt{20}$ | $2/\sqrt{20}$ |
| 0011 | $4/\sqrt{20}$ | $4/\sqrt{20}$ |
| 0100 | $2/\sqrt{20}$ | $-2/\sqrt{20}$ |
| 0101 | $2/\sqrt{20}$ | $-4/\sqrt{20}$ |
| 0110 | $4/\sqrt{20}$ | $-2/\sqrt{20}$ |
| 0111 | $4/\sqrt{20}$ | $-4/\sqrt{20}$ |
| 1000 | $-2/\sqrt{20}$ | $2/\sqrt{20}$ |
| 1001 | $-2/\sqrt{20}$ | $4/\sqrt{20}$ |
| 1010 | $-4/\sqrt{20}$ | $2/\sqrt{20}$ |
| 1011 | $-4/\sqrt{20}$ | $4/\sqrt{20}$ |
| 1100 | $-2/\sqrt{20}$ | $-2/\sqrt{20}$ |
| 1101 | $-2/\sqrt{20}$ | $-4/\sqrt{20}$ |
| 1110 | $-4/\sqrt{20}$ | $-2/\sqrt{20}$ |
| 1111 | $-4/\sqrt{20}$ | $-4/\sqrt{20}$ |

FIG. 16

| $b(i),b(i+1),b(i+2),b(i+3)$ | I | Q |
|---|---|---|
| 0000 | $3/\sqrt{20}$ | $(3-\sqrt{2})/\sqrt{20}$ |
| 0001 | $(3-\sqrt{2})/\sqrt{20}$ | $3/\sqrt{20}$ |
| 0010 | $(3+\sqrt{2})/\sqrt{20}$ | $3/\sqrt{20}$ |
| 0011 | $3/\sqrt{20}$ | $(3+\sqrt{2})/\sqrt{20}$ |
| 0100 | $(3-\sqrt{2})/\sqrt{20}$ | $-3/\sqrt{20}$ |
| 0101 | $3/\sqrt{20}$ | $(-3-\sqrt{2})/\sqrt{20}$ |
| 0110 | $3/\sqrt{20}$ | $(-3+\sqrt{2})/\sqrt{20}$ |
| 0111 | $(3+\sqrt{2})/\sqrt{20}$ | $-3/\sqrt{20}$ |
| 1000 | $(-3+\sqrt{2})/\sqrt{20}$ | $3/\sqrt{20}$ |
| 1001 | $-3/\sqrt{20}$ | $(3+\sqrt{2})/\sqrt{20}$ |
| 1010 | $-3/\sqrt{20}$ | $(3-\sqrt{2})/\sqrt{20}$ |
| 1011 | $(-3-\sqrt{2})/\sqrt{20}$ | $3/\sqrt{20}$ |
| 1100 | $-3/\sqrt{20}$ | $(-3+\sqrt{2})/\sqrt{20}$ |
| 1101 | $(-3+\sqrt{2})/\sqrt{20}$ | $-3/\sqrt{20}$ |
| 1110 | $(-3-\sqrt{2})/\sqrt{20}$ | $-3/\sqrt{20}$ |
| 1111 | $-3/\sqrt{20}$ | $(-3-\sqrt{2})/\sqrt{20}$ |

METHOD AND APPARATUS FOR ENHANCING CHANNEL CAPACITY AND SPECTRAL EFFICIENCY IN A WIRELESS COMMUNICATION SYSTEM

CROSS-REFERENCE TO RELATED APPLICATIONS

The present application claims the benefit of U.S. Provisional Patent Application Ser. No. 62/064,095 filed on Oct. 15, 2014 and U.S. Provisional Patent Application Ser. No. 62/072,007 filed on Oct. 29, 2014, the entire disclosures of which are incorporated herein by reference.

FIELD

This disclosure generally relates to wireless communication networks, and more particularly, to a method and apparatus for enhancing channel capacity and spectral efficiency in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure for which standardization is currently taking place is an Evolved Universal Terrestrial Radio Access Network (E-UTRAN). The E-UTRAN system can provide high data throughput in order to realize the above-noted voice over IP and multimedia services. The E-UTRAN system's standardization work is currently being performed by the 3GPP standards organization. Accordingly, changes to the current body of 3GPP standard are currently being submitted and considered to evolve and finalize the 3GPP standard.

SUMMARY

A method and apparatus of a User Equipment (UE) are disclosed. In one embodiment, the method includes the UE receiving a superposed signal from a base station (BS). The method also includes the UE receiving a signaling from the BS and getting information from the signaling about a first standard modulation scheme for demodulation and a specific indication of how to retrieve at least one transport block from the demodulation output. In addition, the method includes the UE demodulating the superposed signal received from the BS according to the first standard modulation scheme, retrieving at least one transport block from the demodulation output according to the specific indication, and ignoring other portion(s) of the demodulation output.

BRIEF DESCRIPTION OF THE DRAWINGS

FIG. 8 is a reproduction of Table 7.1.2-1 of 3GPP TS 36.211 V12.2.0.

FIG. 9 is a reproduction of Table 7.1.3-1 of 3GPP TS 36.211 V12.2.0.

FIG. 10 is a reproduction of Table 7.1.4-1 of 3GPP TS 36.211 V12.2.0.

FIG. 16 is a self-defined modulation mapping for FIG. 14 according to one exemplary embodiment.

FIG. 17 is a self-defined modulation mapping for FIG. 15 according to one exemplary embodiment.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, or some other modulation techniques.

In particular, the exemplary wireless communication systems devices described below may be designed to the wireless technology discussed in the various documents, including: "Non-Orthogonal Multiple Access (NOMA) for Future Radio Access" by Yuya Saito, Yoshihisa Kishiyama, and Anass Benjebbour; "Concept and Practical Considerations of Non-orthogonal Multiple Access (NOMA) for Future Radio Access" by Anass Benjebbour, Yuya Saito, and Yoshihisa Kishiyama; "System-Level Performance Evaluation of Downlink Non-orthogonal Multiple Access (NOMA)" by Yuya Saito, Anass Benjebbour, Yoshihisa Kishiyama, and Takehiro Nakamura; "System-Level Performance of Downlink NOMA for Future LTE Enhancements" by Anass Benjebbour, Anxin Li, Yuya Saito, and Yoshihisa Kishiyama; and "Wireless Communications" by Andrea Goldsmith, 2005 by Cambridge University Press.

Furthermore, the exemplary wireless communication systems devices described below may be designed to support one or more standards such as the standard offered by a consortium named "3rd Generation Partnership Project" referred to herein as 3GPP, including: METIS Public Deliverable D2.3 "Components of a new air interface—building blocks and performance"; TS 36.300 V12.2.0, "E-UTRA Overall description; Stage 2 (Release 12)"; TS 36.211 V12.2.0 "E-UTRA Physical channels and modulation (Release 12)"; TS 36.212 V12.1.0 "E-UTRA Multiplexing and channel coding (Release 12)"; and TS 36.213 V12.1.0 "E-UTRA Physical layer procedures (Release 12)". The standards and documents listed above are hereby expressly incorporated by reference in their entirety.

Figure 1:
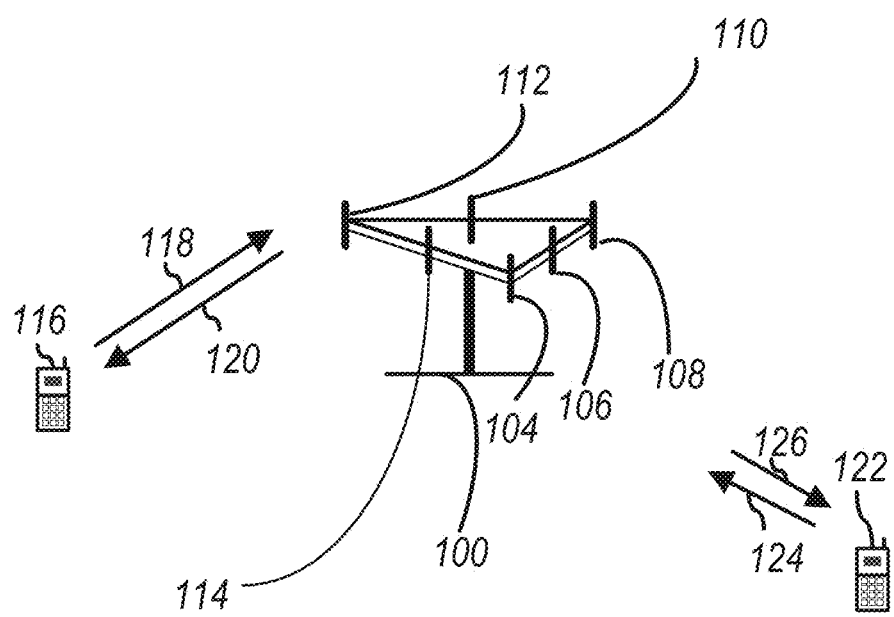
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an evolved Node B (eNB), or some other terminology. An access terminal (AT) may also be called user equipment (UE), a wireless communication device, terminal, access terminal or some other terminology.

Figure 2:
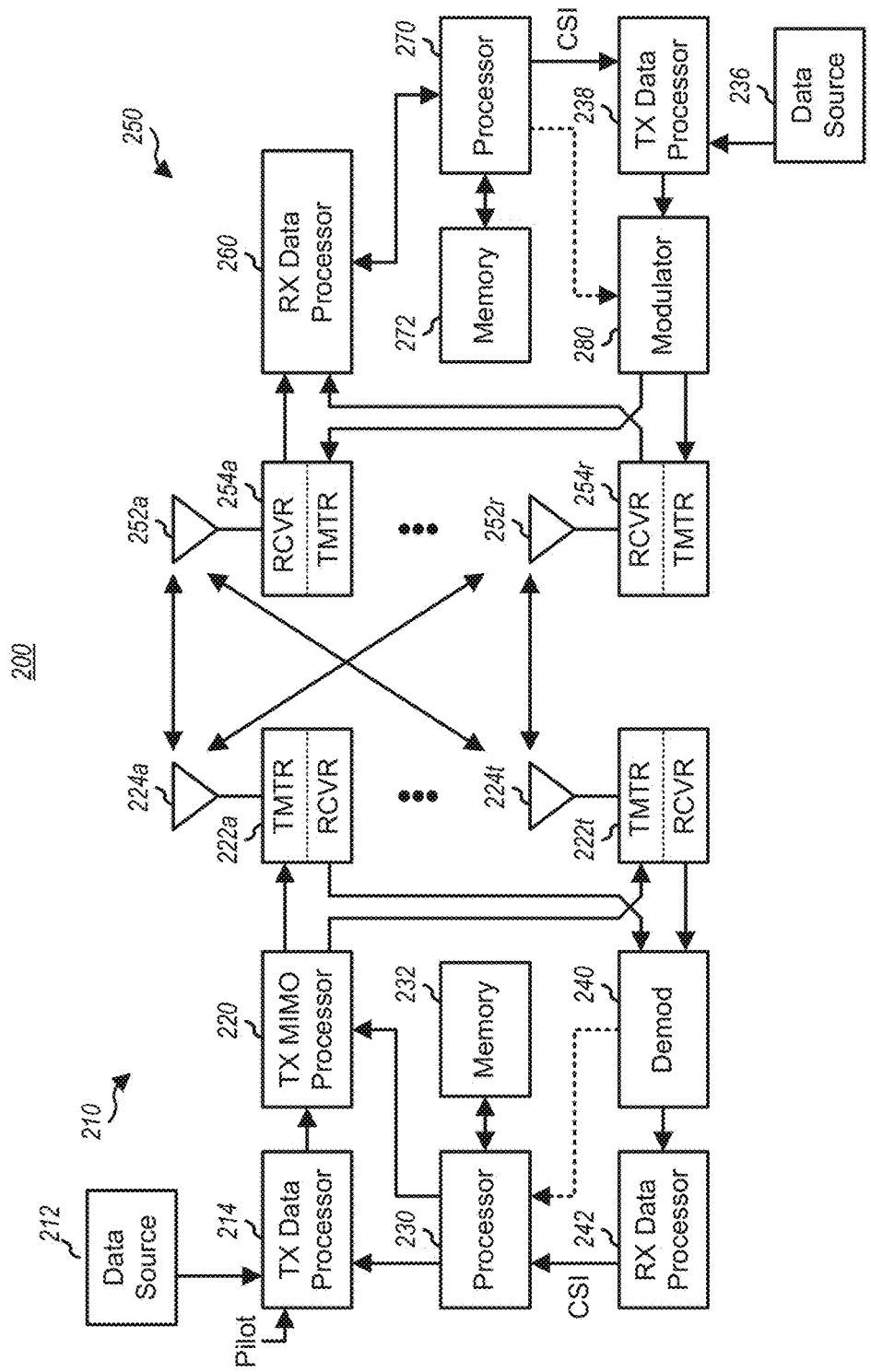
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
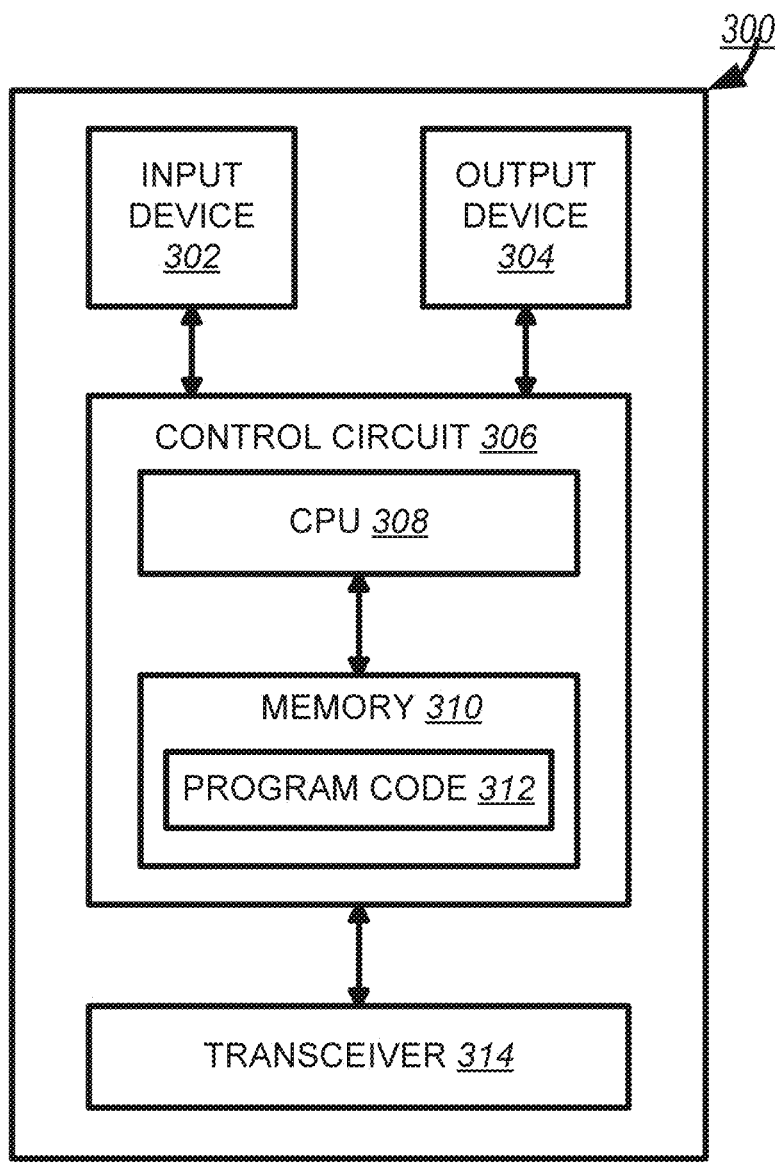
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1, and the wireless communications system is preferably the LTE system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly.

Figure 4:
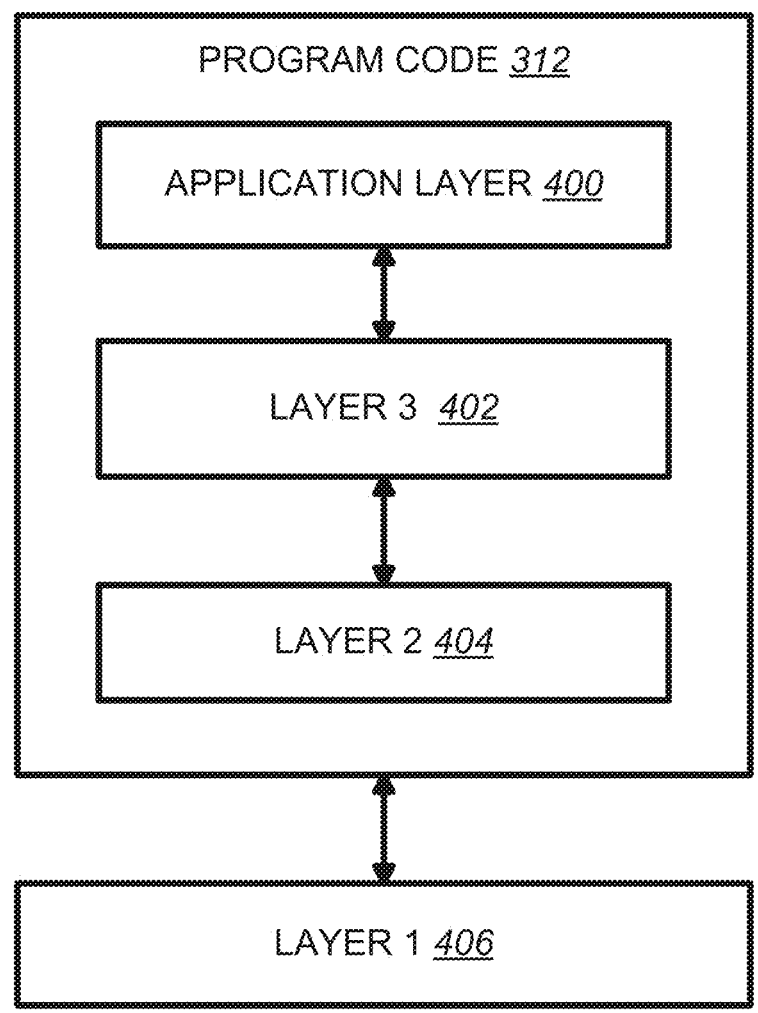
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

In the study for a future mobile and wireless communication system, NOMA (Non-Orthogonal Multiple Access) is considered as a useful technique. Comparing to the current OMA (Orthogonal Multiple Access) technique, NOMA could provide higher channel capacity and hence higher spectral efficiency by multiplexing signals for multiple UEs in the power domain, as discussed in the following documents: "Non-Orthogonal Multiple Access (NOMA) for Future Radio Access", "Concept and Practical Considerations of Non-orthogonal Multiple Access (NOMA) for Future Radio Access", "System-Level Performance Evaluation of Downlink Non-orthogonal Multiple Access (NOMA)", and "System-Level Performance of Downlink NOMA for Future LTE Enhancements" listed and referenced above.

Furthermore, in the METIS project (as discussed in METIS Public Deliverable D2.3), NOMA is included as one of the radio link technology components to achieve the target of 1,000 times higher mobile data volume per area. In particular, METIS Public Deliverable D2.3 states:

2.5 Advanced Signaling Concepts

In [HK12, HK13], a downlink non-orthogonal multiple access is investigated where multiple users are multiplexed in the power-domain, at the transmitter side, and multi-user signal separation is conducted at the receiver side based on successive interference cancellation (SIC).

In [SKB+13, BSK+13], the basic concept and benefits of non-orthogonal multiple access (NOMA) as a candidate for future multiple access schemes are explained and discussed in details. In [SBK+13, BLS+13], initial system-level evaluation results of NOMA were discussed and investigated to demonstrate its potential gains in low and high mobility scenarios assuming with and without SIC error propagation, exhaustive full search on candidate user pairs, and dynamic transmit power allocation such as fractional transmit power allocation (FTPA).

Signaling for Non-Orthogonal Multiple Access

Signaling aspects related to multi-user power allocation and MCS selection are also studied for NOMA in order to balance performance gains with signaling overhead. Here, the impact of signaling reduction of full-search power allocation on NOMA performance is investigated.

Full Search Multi-User Power Allocation (FSPA)

Exhaustive full search of user pairs and transmit power allocations provide the best performance for NOMA. In the case of full search power allocation, multiple combinations of power allocations are considered for all candidate user sets considered by the scheduler. For FSPA, the number of power sets N to be searched becomes an optimization parameter. With large number of power sets, the performance gains of NOMA increase, while with less number of power sets, we can decrease the amount of downlink signaling. For example, the order of successive interference cancellation (SIC) and information on power assignment do not need to be transmitted in every subframe but rather on a longer time scale.

In LTE/LTE-A, the overall architecture is described in 3GPP TS 36.300 V12.2.0. For downlink transmission, data transmitted from network to a UE, the processing structure is described in Section 6 of 3GPP TS 36.211 V12.2.0 and Section 5.3 of 3GPP TS 36.212 V12.1.0, and the related procedures are described in Section 7 of 3GPP TS 36.213 V12.1.0.

Figure 5:
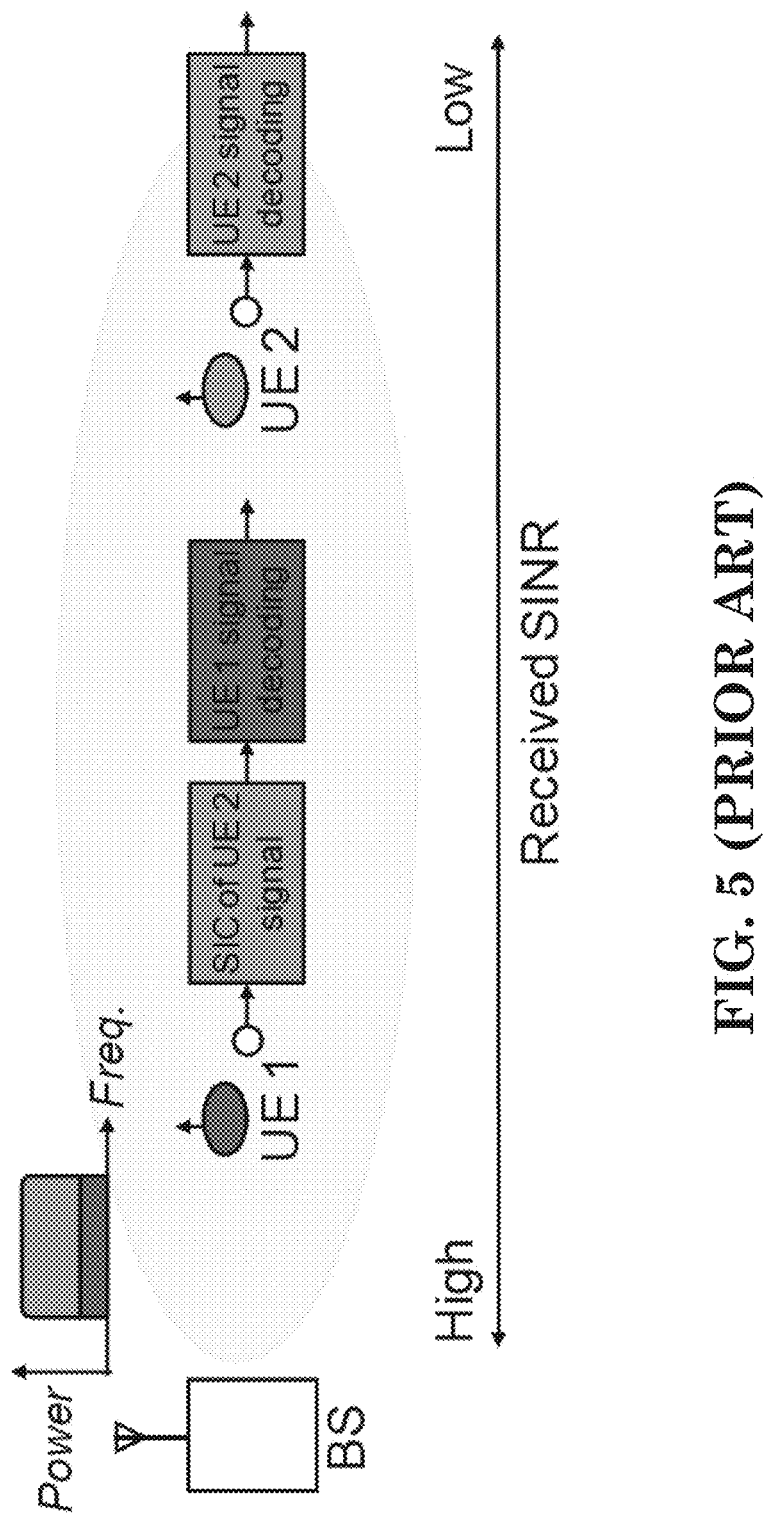
FIG. 5 is a reproduction of a figure in "Concept and Practical Considerations of Non-orthogonal Multiple Access (NOMA) for Future Radio Access" by Anass Benjebbour, Yuya Saito, and Yoshihisa Kishiyama).

NOMA is considered as a multiple access technique in the power domain. In DL (Downlink), the network can have one transmission to multiple UEs (e.g., paired UEs) on the same radio resource in the same timing. As shown in FIG. 5 (which is a reproduction of a figure in "Concept and Practical Considerations of Non-orthogonal Multiple Access (NOMA) for Future Radio Access" by Anass Benjebbour, Yuya Saito, and Yoshihisa Kishiyama), upon receiving a transmission on the radio resource in the reception timing, UE1 first decodes the signal for UE2 and then regenerate the signal for UE2 according to the decoding result and then cancels the signal for UE2 part from the received transmission. After the cancellation, the remaining part of the received transmission is the signal for UE1 and the UE1 can decode the signal for UE1.

However, if UE1 does not successfully decode the signal of UE2, the interference caused by the signal of UE2 could not be cancelled. Then the UE1 could not decode the signal of UE1 successfully. More important, the SIC (Successive Interference Cancellation) receiving procedure is more complicated than the traditional way because it needs multiple processing steps of signal decoding, regeneration, and cancellation. These processing steps require additional hardware components and it will cause the increase of the UE manufacture cost and the UE power consumption.

Therefore, it would be beneficial to invent a new way of signal transmission and reception, which can achieve the gain of NOMA but without using the SIC receiving procedure. Such new way of signal transmission and reception would increase the channel capacity and hence the spectral efficiency of nowadays communication system without additional hardware requirements.

Figure 6:
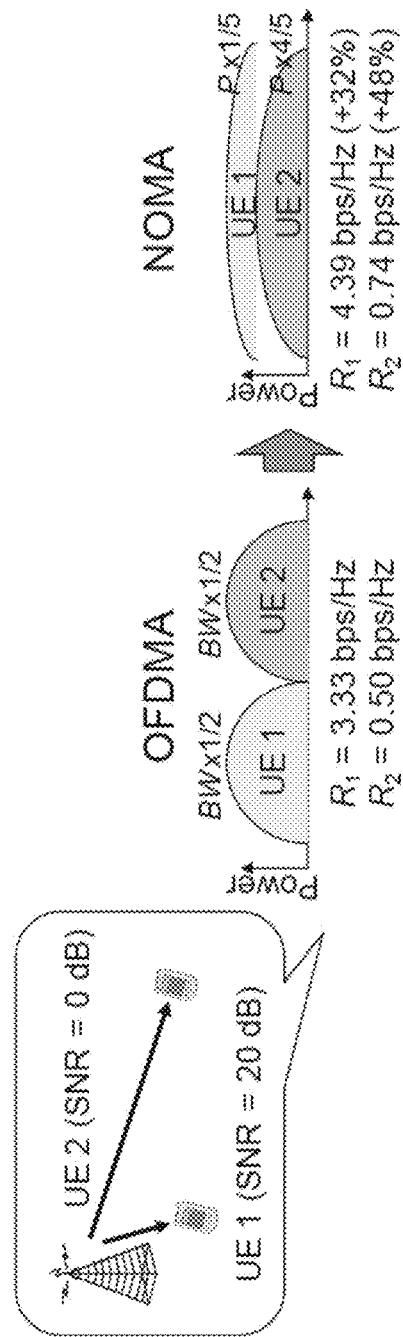
FIG. 6 is a reproduction of a figure in "Concept and Practical Considerations of Non-orthogonal Multiple Access (NOMA) for Future Radio Access" by Anass Benjebbour, Yuya Saito, and Yoshihisa Kishiyama).

In general, FIG. 6 illustrates an exemplary scenario of NOMA. The base station transmits a combined signal for UE1 and UE2. The combined signal is the superposition of the signal for UE1, and the signal for UE2, which can be expressed as follows:

$$x = \sqrt{P_1} x_1 + \sqrt{P_2} x_2$$

The transmit power $P_1$ is the power of the signal for UE1; and the transmit power $P_2$ is the power of the signal for UE2. The total transmit power P of the combined signal is the summation of each transmit power of the signal for each UE, which can be expressed as $P=P_1 \pm P_2$.

For digital wireless communication, phase shift keying is generally used as the modulation scheme and the modulation mapper takes the binary digits, 0 or 1, as input and produces complex-valued modulation symbols as output (discussed in 3GPP TS 36.211 V12.2.0). Assuming both the signal for UE1 and the signal for UE2 use the QPSK (Quadrature (Quaternary) Phase Shift Keying) modulation scheme. The signals can be expressed as follows:

$$x_1=[\cos(\omega \cdot t+\phi_{I1}-\theta_1)+\sin(\omega \cdot t+\phi_{Q1}-\theta_1)]$$

$$x_2=[\cos(\omega \cdot t+\phi_{I2})+\sin(\omega \cdot t+\phi_{Q2})].$$

The variables $\phi_{I1}$ and $\phi_{I2}$ are the in-phase variables. The variables $\phi_{Q1}$ and $\phi_{Q2}$ are the quadrature variables. The one-to-one mapping relationship between complex-valued symbols and the strings of bit(s) can be specified in a technical document, such as 3GPP TS 36.211. When using QPSK, the signals $x_1$ and $x_2$ both carry a pair of binary bits, and each pair of binary bits has 4 possible combinations, $\{(0,0), (0,1), (1,0), (1,1)\}$.

The variable $\theta_1$ is the phase difference between the signal for UE1 and the signal for UE2. The signals $x_1$ and $x_2$ are both sinusoidal wave and have the same frequency. Assuming the signal power levels where $P_1=1$ and $P_2=4$, the combined signal can be expressed as follows:

$$x=1 \cdot x_1 + 2 \cdot x_2$$

$$x=[1 \cdot \cos(\omega \cdot t+\phi_{I1}-\theta_1)+1 \cdot \sin(\omega \cdot t+\phi_{Q1}-\theta_1)]+[2 \cdot \cos(\omega \cdot t+\phi_{I2})+2 \cdot \sin(\omega \cdot t+\phi_{Q2})]$$

Figure 7:
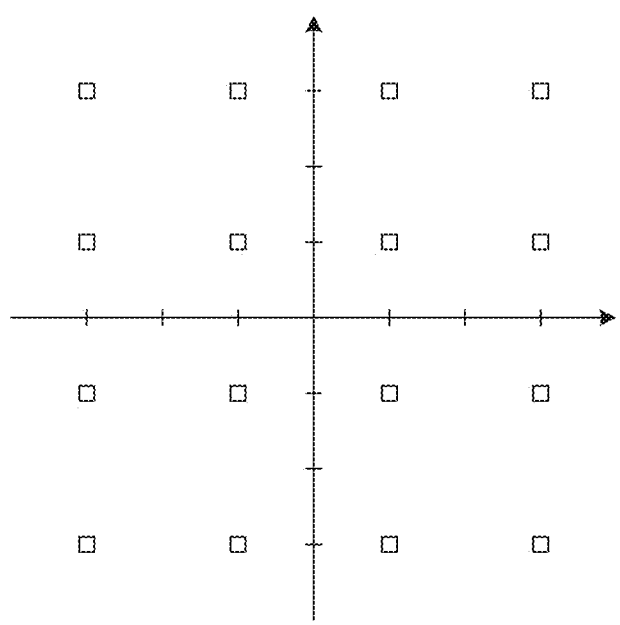
FIG. 7 is a diagram according to one exemplary embodiment.

Assuming $\theta_1=0=0°$, there are 16 possible binary digit combinations for the combined signal x. FIG. 7 shows the 16 possible complex-valued modulation symbol locations for the combined signal x. FIG. 7 has the same 16 symbol locations as the constellation diagram of the 16QAM (Quadrature Amplitude Modulation) modulation scheme for the quadruplets of bits, including b(i), b(i+1), b(i+2), and b(i+3). Because the mapping between the quadruplets of bits (label of bit assignment) and the symbols is one-to-one, it is feasible to generate a new signal that carries the same 4 binary bits information with the same transmit power P to replace the original combined signal x. The new signal can be generated by combining the two pairs of binary bits of the signals $x_1$ and $x_2$ together to form the quadruplet of bits and then using the 16QAM modulation scheme to modulate the quadruplet of bits. Since the new signal has the same frequency and the same transmit power as the original combined signal, the physical radio transmission, propagation, and reception characteristics would be the same.

The base station generally uses a signaling to inform the receiving UEs about the modulation scheme that the UE should use for demodulation. For example, the downlink control information (DCI) of LTE system (as discussed in 3GPP TS 36.212 V12.1.0) contains the information about modulation and coding scheme. As an example, the base station can inform UE1 to use the 16QAM modulation scheme for demodulation, and inform UE2 to use the QPSK modulation scheme for demodulation. Besides, the base station should inform the UE1 to discard the bits belonging to the signal for UE2, which are b(i), b(i+1) in this example, and to keep only the bits belonging to the signal for UE1, which are b(i+2), b(i+3) in this example.

The modulation schemes of QPSK, 16QAM, and 64QAM specified in Section 7.1 of 3GPP TS 36.211 V12.2 are shown in FIG. 8, FIG. 9, and FIG. 10, respectively. Instead of using the SIC receiving procedure, the concept of joint demodulation can be applied at UE1 to get the binary bits sent for UE1 from the signal which is transmitted from base station to UE1 and UE2 and received by UE1, through the traditional demodulation procedure by utilizing the standard modulation scheme and the additional information as described below, wherein the signal received by UE1 can be the original combined signal x or the new signal generated by combining two pairs of binary bits of the signals $x_1$ and $x_2$ together to form the quadruplet of bits and then using the 16QAM modulation scheme to modulate the quadruplet of bits.

In general, the signaling for informing the receiving UE about the modulation scheme for which the UE should use for demodulation already exists in current wireless communication systems. However, the new signaling for informing the receiver UE about how to map and retrieve the bits from the demodulation output should be additionally needed. If the original combined signal is transmitted, the information about how to map and retrieve the bits from the demodulation output are both needed. Instead, if the new signal generated by combining two pairs of binary bits is transmitted, only the information about how to retrieve the bits from the demodulation output is needed because the bit mapping has been done by combining two pairs of binary bits at transmitter side. In order to save the signaling for bit mapping, it is preferable to transmit the new signal generated by combining two pairs of binary bits of the signals $x_1$ and $x_2$, instead of transmitting the original combined signal x.

The general idea can be extended to a number of other scenarios. In one example, the signal for UE1 uses 16QAM modulation; and the signal for UE2 uses QPSK modulation. Assume that the signal power levels: $P_1=5$, $P_2=16$, the combined signal will have 64 possible complex-valued modulation symbols. Therefore it is possible to generate a new signal for transmission by combining the binary bits of the signals $x_1$ and $x_2$ together and then using the 64QAM transmitting modulation scheme. The base station can use signaling to inform (1) the UE1 to use 64QAM modulation scheme for demodulation and, (2) the UE2 to use QPSK modulation scheme for demodulation. Besides, the base station should also inform the UE1 to discard the bits belonged to the signal for UE2 (which are b(i) and b(i+1) in this example), and to keep the bits belonged to the signal for UE1 (which are b(i+2), b(i+3), b(i+4), and b(i+5) in this example).

In another example, the base station transmits a combined signal for UE1, UE2, and UE3. Assume that (1) all three signals for UE1, UE2, and UE3 use QPSK modulation, and (2) the signal power levels: $P_1=1$, $P_2=4$, and $P_3=16$, the combined signal will have 64 possible complex-valued modulation symbols. The original combined signal can be expressed as following:

$$x=+\sqrt{P_1}x_1+\sqrt{P_2}x_2+\sqrt{P_3}x_3=1 \cdot x_1+2 \cdot x_2+4 \cdot x_3$$

$$x_1=[\cos(\omega \cdot t+\phi_{I1}-\theta_1)+\sin(\omega \cdot t+\phi_{Q1}-\theta_1)]$$

$$x_2=[\cos(\omega \cdot t+\phi_{I2}-\theta_2)+\sin(\omega \cdot t+\phi_{Q2}-\theta_2)]$$

$$x_3=[\cos(\omega \cdot t+\phi_{I3})+\sin(\omega \cdot t+\phi_{Q3})]$$

In other words, it would be feasible to generate a new signal for transmission by combining the three pairs of binary bits of the signals $x_1$, $x_2$ and $x_3$ together and then using the 64QAM transmitting modulation scheme. The base station can use signaling to inform (1) the UE1 to use 64QAM modulation scheme for demodulation, (2) the UE2 to use 16QAM modulation scheme for demodulation, and (3) the UE3 to use QPSK modulation scheme for demodulation. Besides, the base station should also inform the UE1 to discard the bits that belong to the signals for UE2 and UE3 (which are b(i), b(i+1), b(i+2), and b(i+3) in this example), and to keep the bits belonged to the signal for UE1 (which are b(i+4) and b(i+5) in this example). Furthermore, the base station should also inform the UE2 to discard the bits belonged to the signal for UE3 (which are b(i) and b(i+1) in this example), and to keep the bits belonged to the signal for UE2 (which are b(i+2) and b(i+3) in this example).

It is conceivable that higher order modulation schemes (such as, 256QAM) can be used for transmitting signal to multiple UEs without departing from the spirit and scope of this invention.

Furthermore, the signal transmitter is not limited to the base station and the signal receivers are not limited to the UEs. For example, in the case of D2D ProSe communication, the transmitter can be a UE and the receiver(s) can be other UE(s) or a base station. The method and apparatus can be used in any type of communication system.

Figure 11:
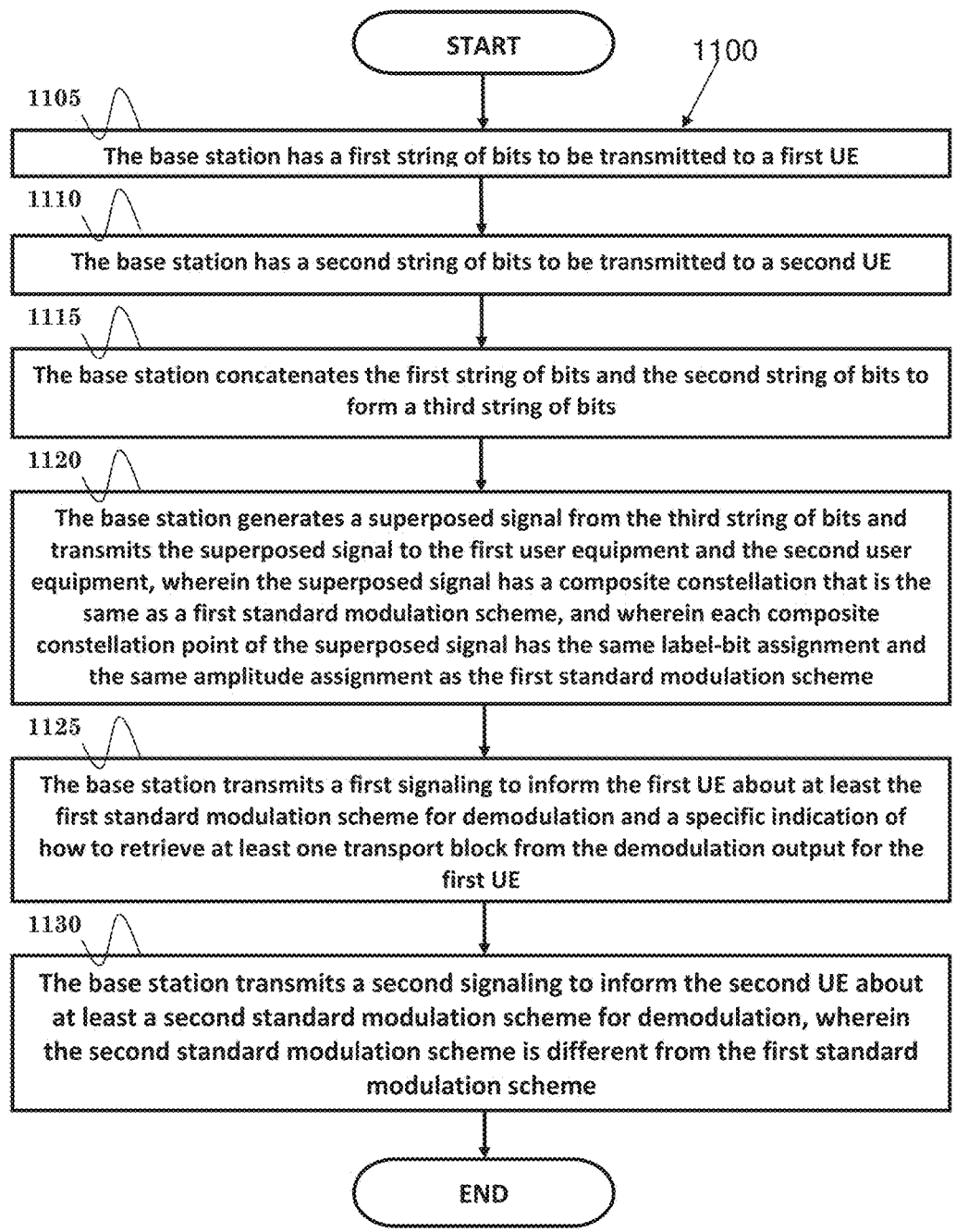
FIG. 11 is a flow chart according to one exemplary embodiment.

FIG. 11 is a flow chart 1100, from the perspective of a base station in accordance with one exemplary embodiment. In step 1105, the base station has a first string of bits to be transmitted to a first UE. In step 1110, the base station has a second string of bits to be transmitted to a second UE. In step 1115, the base station concatenates the first string of bits and the second string of bits to form a third string of bits. In one embodiment, the first, second, and third strings of bits are strings of binary digits (0 or 1) respectively.

In step 1120, the base station generates a superposed signal from the third string of bits and transmits the superposed signal to the first user equipment and the second user equipment, wherein the superposed signal has a composite constellation that is the same as a first standard modulation scheme, and wherein each composite constellation point of the superposed signal has the same label-bit assignment and the same amplitude assignment as the first standard modulation scheme. In step 1125, the base station transmits a first signaling to inform the first UE about at least the first standard modulation scheme for demodulation and a specific indication of how to retrieve at least one transport block from the demodulation output for the first UE. In step 1130, the base station transmits a second signaling to inform the second UE about at least a second standard modulation scheme for demodulation, wherein the second standard modulation scheme is different from the first standard modulation scheme.

In one embodiment, the first standard modulation scheme could be QPSK (Quadrature (Quaternary) Phase Shift Keying), 16 QAM (Quadrature Amplitude Modulation), 64 QAM, or 256 QAM. The second standard modulation scheme could also be QPSK, 16 QAM, 64 QAM, or 256 QAM.

In one embodiment, the first signaling could be a control element (CE), a downlink control information (DCI), or a RRC (Radio Resource Control) message. The second signaling could also be a CE, a DCI, or a RRC (Radio Resource Control) message.

Referring back to FIGS. 3 and 4, in one embodiment, from the perspective of a base station that has a first string of bits to be transmitted to a first UE and a second string of bits to be transmitted to a second UE, the device 300 includes a program code 312 stored in memory 310 of the transmitter. The CPU 308 could execute program code 312 to concatenate the first string of bits and the second string of bits to form a third string of bits. The CPU could further execute program code 312 to generate a superposed signal from the third string of bits and transmits the superposed signal to the first user equipment and the second user equipment, wherein the superposed signal has a composite constellation that is the same as a first standard modulation scheme, and wherein each composite constellation point of the superposed signal has the same label-bit assignment and the same amplitude assignment as the first standard modulation scheme. The CPU could also execute program code 312 (i) to transmit a first signaling to inform the first UE about at least the first standard modulation scheme for demodulation and a specific indication of how to retrieve at least one transport block from the demodulation output for the first UE, and (ii) to transmit a second signaling to inform the second UE about at least a second standard modulation scheme for demodulation, wherein the second standard modulation scheme is different from the first standard modulation scheme.

In addition, the CPU 308 can execute the program code 312 to perform all of the above-described actions and steps or others described herein.

Figure 12:
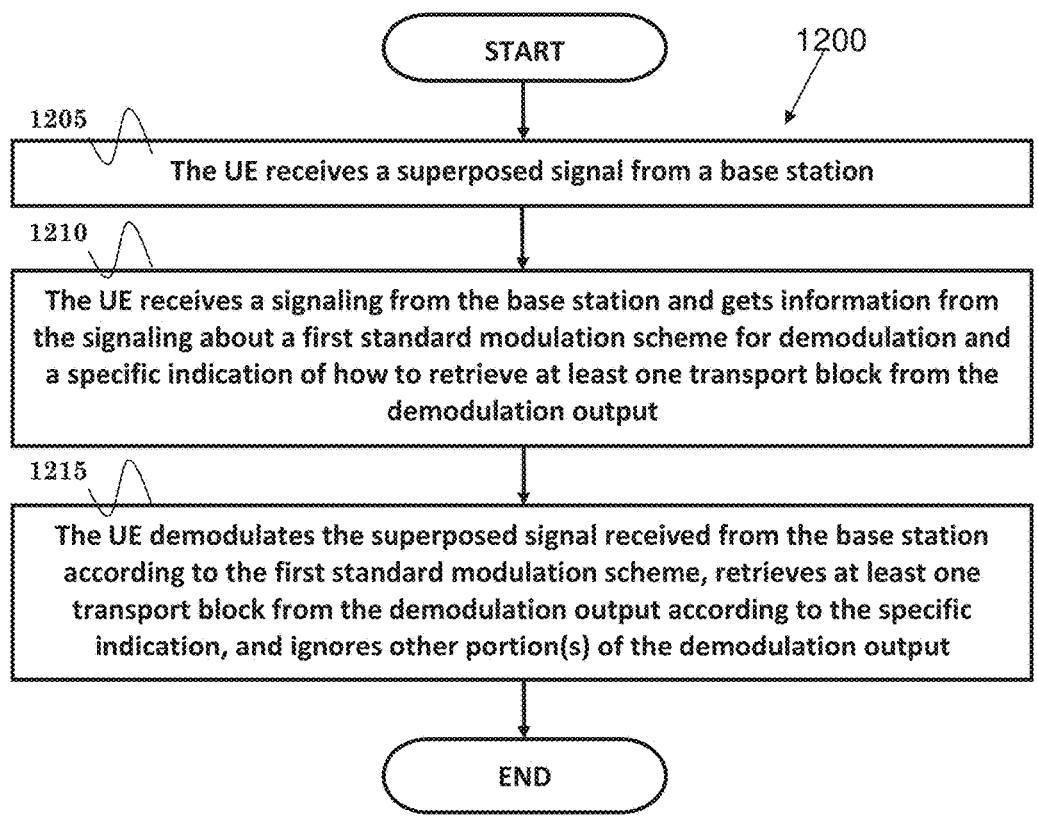
FIG. 12 is a flow chart according to one exemplary embodiment.

FIG. 12 is a flow chart 1200, from the perspective of a UE in accordance with one exemplary embodiment. In step 1205, the UE receives a superposed signal from a base station. In step 1210, the UE receives a signaling from the base station and gets information from the signaling about a first standard modulation scheme for demodulation and a specific indication of how to retrieve at least one transport block from the demodulation output. In step 1215, the UE demodulates the superposed signal received from the base station according to the first standard modulation scheme, retrieves at least one transport block from the demodulation output according to the specific indication, and ignores other portion(s) of the demodulation output.

In one embodiment, the first standard modulation scheme could be QPSK, 16 QAM, 64 QAM, or 256 QAM. The second standard modulation scheme could also be QPSK, 16 QAM, 64 QAM, or 256 QAM.

In one embodiment, the first signaling could be a CE, a DCI, or a RRC message. The second signaling could also be a CE, a DCI, or a RRC message.

Referring back to FIGS. 3 and 4, in one embodiment, from the perspective of a UE, the device 300 includes a program code 312 stored in memory 310 of the transmitter. The CPU 308 could execute program code 312 (i) to receive a superposed signal from a base station (ii) to receive a signaling from the base station and gets information from the signaling about a first standard modulation scheme for demodulation and a specific indication of how to retrieve at least one transport block from the demodulation output, and (iii) to demodulate the superposed signal received from the base station according to the first standard modulation scheme, retrieve at least one transport block from the demodulation output according to the specific indication, and ignore other portion(s) of the demodulation output. In addition, the CPU 308 can execute the program code 312 to perform all of the above-described actions and steps or others described herein.

In general, FIG. 6 illustrates an exemplary scenario of NOMA. The base station transmits a combined signal for UE1 and UE2. The combined signal is the superposition of the signal for UE1, and the signal for UE2, which can be expressed as follows:

$$x = \sqrt{P_1} x_1 + \sqrt{P_2} x_2$$

The transmit power $P_1$ is the power of the signal for UE1 and the transmit power $P_2$ is the power of the signal for UE2. The total transmit power P of the combined signal is the summation of each transmit power of the signal for each UE, which can be expressed as $P=P_1+P_2$ in this example. The received signal at UE1, excluding the noise, can be represented as $y=h_1 \cdot x=h_1 \sqrt{P_1} \cdot x_1 + h_1 \sqrt{P_2} x_2$, wherein $h_1$ is the complex channel coefficient between UE1 and the base station.

Although the above example of NOMA is for a combined signal transmitted from one transmitter to two receivers, the references "Non-Orthogonal Multiple Access (NOMA) for Future Radio Access" by Yuya Saito, Yoshihisa Kishiyama, and Anass Benjebbour and "Concept and Practical Considerations of Non-orthogonal Multiple Access (NOMA) for Future Radio Access" by Anass Benjebbour, Yuya Saito, and Yoshihisa Kishiyama mention that the idea of NOMA can be applied to uplink transmission with SIC receiver at the base station.

Figure 13:
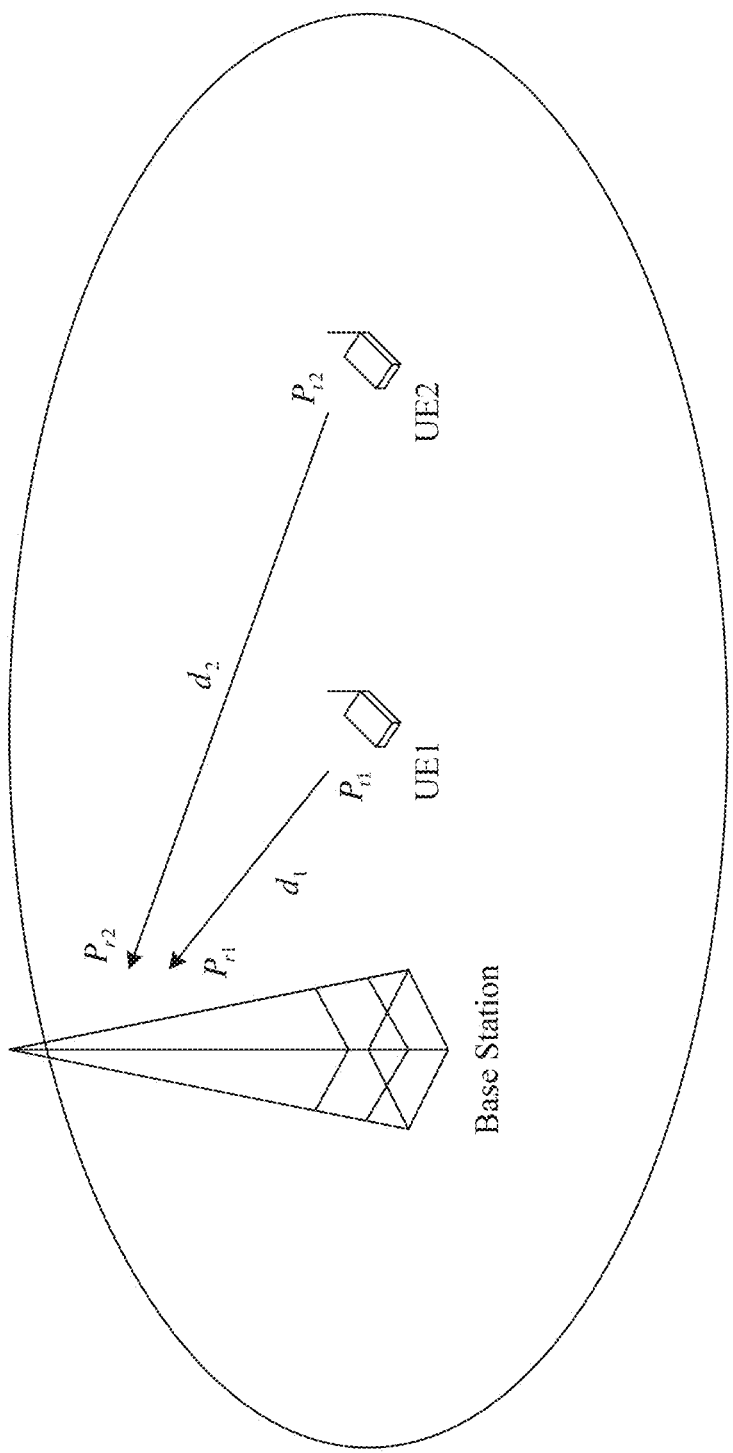
FIG. 13 is a diagram according to one exemplary embodiment.

In general, FIG. 13 illustrates an exemplary uplink scenario. The signals transmitted from two transmitters are combined together and are received by one receiver. By properly paired the transmitters with different channel gains, NOMA could achieve lower total output power from the transmitters in comparing with using OMA. In other words, to reach the same channel capacity, NOMA would require lower total output power from the transmitters. More important, NOMA would require less output power from the cell-edge UE to get the same transfer rate in comparison with using OMA. This effect could improve the fairness for the cell-edge UE, which is generally limited by the UE output power. The uplink scenario generally shown in FIG. 13 could be considered as a special case of the general scenario about applying the idea of NOMA, wherein the signals transmitted from multiple transmitters are combined together and are received by one receiver.

In FIG. 13, the receive power $P_{r1}$ is the power of the signal from UE1 received at the base station and the receive power $P_{r2}$ is the power of the signal from UE2 received at the base station. The receive power of each signal is the product of the transmit power from each UE and the channel gain encountered by each signal. The equation could be expressed as $P_{r1}=P_{t1} \cdot |h_1|^2$ and $P_{r2}=P_{t2} \cdot |h_2|^2$ for UE1 and UE2. Because the channel gain $|h_1|^2$ and $|h_2|^2$ could be known by the base station through measuring the reference signal, the receive power of each signal from each UE could be controlled by adjusting the signal transmit power from each UE. The combined signal received at the base station could be expressed as follows:

$$y = \sqrt{P_{r1}} \cdot y_1 + \sqrt{P_{r2}} \cdot y_2 = |h_1| \cdot \sqrt{P_{t1}} \cdot y_1 + |h_2| \cdot \sqrt{P_{t2}} \cdot y_2.$$

For both the downlink scenario and uplink scenario, the combined signals received at the receiver could have the same formulation. For digital wireless communication, phase shift keying is generally used as the modulation scheme, and the modulation mapper would take the binary digits, 0 or 1, as input and produces complex-valued modulation symbols as output (as discussed in 3GPP TS 36.211). Assume that QPSK is used for both signals $s_1$ and $s_2$, the general received signal for both downlink and uplink scenario could be expressed as follows:

$$s = A_1 \cdot s_1 + A_2 \cdot s_2$$

$$s_1 = [\cos(\omega \cdot t + \phi_{I1}) + \sin(\omega \cdot t + \phi_{Q1})]$$

$$s_2 = [\cos(\omega \cdot t + \phi_{I2} - \theta) + \sin(\omega \cdot t + \phi_{Q2} - \theta)]$$

The variables $\phi_{I1}$ and $\phi_{I2}$ are the phase shift of the in-phase carrier signal. The variables $\phi_{Q1}$ and $\phi_{Q2}$ are the phase shift of the quadrature carrier signal. The variable $\theta$ is the phase difference between the signals $s_1$ and $s_2$. As an example, for $\theta = 0°$ with the signal amplitudes $A_1=2$ and $A_2=1$, the combined signal can be expressed as follows:

$$s = [2 \cdot \cos(\omega \cdot t + \phi_{I1}) + 2 \cdot \sin(\omega \cdot t + \phi_{Q1})] + [1 \cdot \cos(\omega \cdot t + \phi_{I2}) + 1 \cdot \sin(\omega \cdot t + \phi_{Q2})]$$

There are 16 possible binary digit combinations for the combined signal s and the corresponding 16 possible complex-valued modulation symbols are shown in FIG. 7. This figure is in the same form as the constellation diagram of the 16QAM modulation for the quadruplets of bits, b(i), b(i+1), b(i+2), b(i+3), which is specified in 3GPP TS 36.211. Therefore, the receiver could use the 16QAM receiving modulation scheme to demodulate the received combined signal. The original transmitted bits can be retrieved from the demodulated bits with proper mapping operation.

Figure 14:
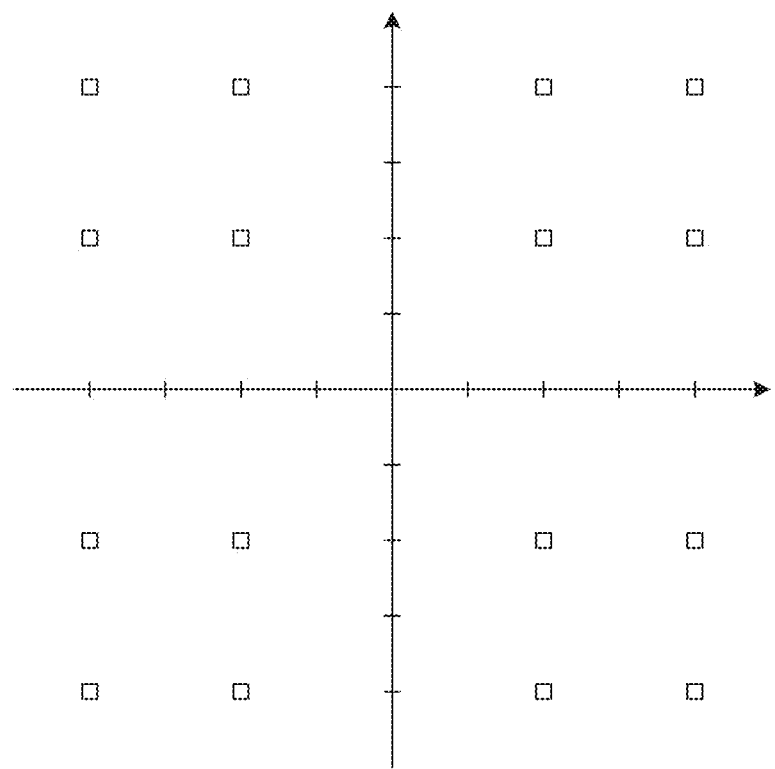
FIG. 14 is a diagram according to one exemplary embodiment.
Figure 15:
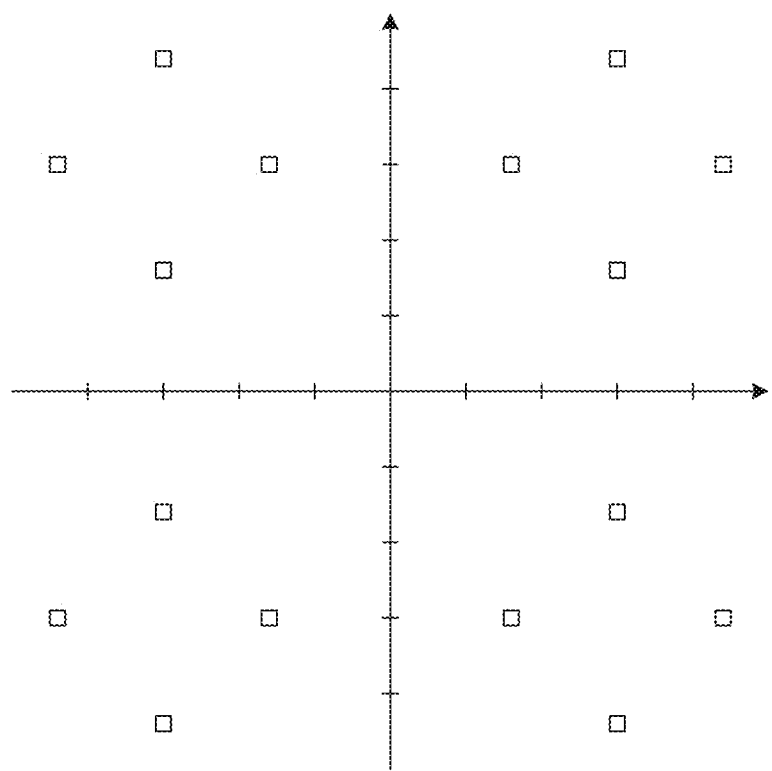
FIG. 15 is a diagram according to one exemplary embodiment.

The example of $\theta = 0°$ with the signal amplitudes $A_1=3$ and $A_2=1$, the constellation diagram of the combined signal is shown in FIG. 14. Another example of $\theta = 45°$ with the signal amplitudes $A_1=3$ and $A_2=1$, the constellation diagram of the combined signal is shown in FIG. 15. Other combinations of different signal amplitudes of signals, different phase difference between signals, and different modulation schemes for signals could exist and could lead to the constellation diagram of the combined signal not included in the pre-defined modulation scheme (such as the modulation mappers of QPSK, 16QAM, and 64QAM specified in Section 7.1 of 3GPP TS 36.211), which are shown in FIG. 8, FIG. 9, and FIG. 10 respectively.

According to the reference "Wireless Communications" by Andrea Goldsmith, the MQAM (M-ary Quadrature Amplitude Modulation) demodulator requires both amplitude and phase estimates of the channel so that the decision regions used in detection to estimate the transmitted bit are not skewed in amplitude or phase. The channel amplitude is used to scale the decision regions to correspond to the transmitted symbol. This scaling is called Automatic Gain Control (AGC). If the channel gain is estimated in error, then the AGC would improperly scale the received signal, which could lead to incorrect demodulation even in the absence of noise. The channel gain is typically obtained using pilot symbols to estimate the channel gain at the receiver.

Since the pre-defined modulation schemes are not enough for realistic communication condition when the combined signal is applied, the invention generally proposes a self-defined adjustable modulation scheme for the transmitter to modulate and for the receiver to demodulate the combined signal. The concept of self-defined adjustable modulation scheme could be used in the scenario of one transmitter to multiple receivers, e.g., downlink. The network controller could use signaling to inform the transmitter about the self-defined adjustable modulation scheme to generate the combined signal, and could also use signaling to inform the receiver about the self-defined adjustable modulation scheme to demodulate the combined signal. For example, an exemplary self-defined modulation scheme for FIG. 14 is shown in FIG. 16, and an exemplary self-defined modulation scheme for FIG. 15 is shown in FIG. 17.

Because the self-defined modulation scheme is only used as the decision region to estimate the bit(s) from constellation diagram, it is anticipated that other receiver function stages could be kept the same. By referring to the self-defined modulation scheme, the minimum mean square error (MMSE) method could be used to estimate the bit(s). The combined signal which applied the idea of NOMA can be received and demodulated by the traditional receiving procedure instead of SIC (Successive Interference Cancellation) receiving procedure. By introducing the self-defined adjustable modulation scheme, the problems occur in realistic communication condition can be solved.

The disclosed method and apparatus could be used in any type of communication system. Accordingly, it is to be understood that the invention is not limited by the specific illustrated embodiment, but only by the scope of the claims below.

Figure 18:
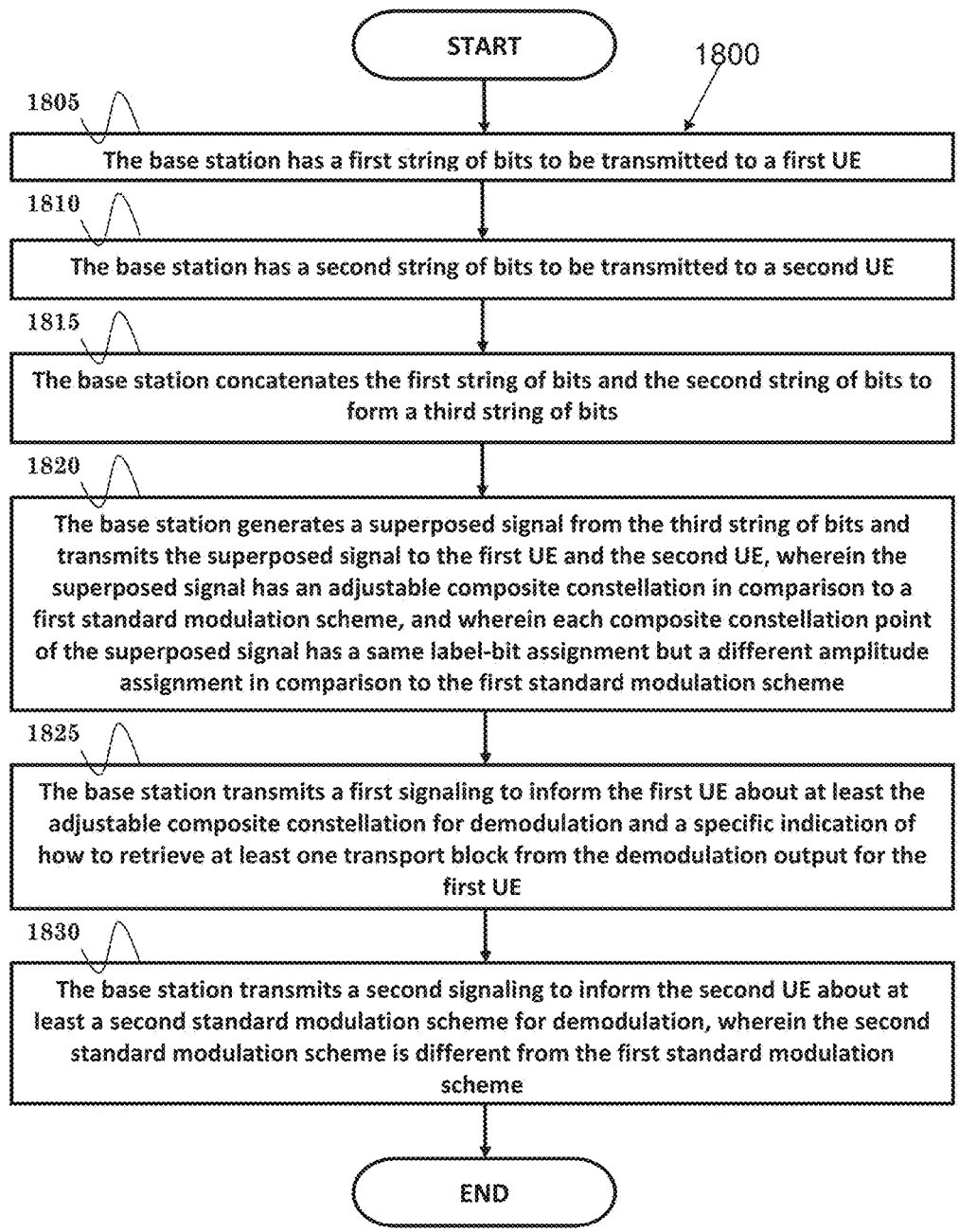
FIG. 18 is a flow chart according to one exemplary embodiment.

FIG. 18 is a flow chart 1800, from a base station perspective in accordance with one exemplary embodiment. In step 1805, the base station has a first string of bits to be transmitted to a first UE. In step 1810, the base station has a second string of bits to be transmitted to a second UE. In step 1815, the base station concatenates the first string of bits and the second string of bits to form a third string of bits. In one embodiment, the first, second, and third strings of bits are strings of binary digits (0 or 1) respectively.

In step 1820, the base station generates a superposed signal from the third string of bits and transmits the superposed signal to the first UE and the second UE, wherein the superposed signal has an adjustable composite constellation in comparison to a first standard modulation scheme, and wherein each composite constellation point of the superposed signal has a same label-bit assignment but a different amplitude assignment in comparison to the first standard modulation scheme. In step 1825, the base station transmits a first signaling to inform the first UE about at least the adjustable composite constellation for demodulation and a specific indication of how to retrieve at least one transport block from the demodulation output for the first UE. In step 1830, the base station transmits a second signaling to inform the second UE about at least a second standard modulation scheme for demodulation, wherein the second standard modulation scheme is different from the first standard modulation scheme.

In one embodiment, the first standard modulation scheme could be QPSK (Quadrature (Quaternary) Phase Shift Keying), 16 QAM (Quadrature Amplitude Modulation), 64 QAM, or 256 QAM. The second standard modulation scheme could also be QPSK, 16 QAM, 64 QAM, or 256 QAM.

In one embodiment, the first signaling could be a control element (CE), a downlink control information (DCI), or a RRC (Radio Resource Control) message. The second signaling could also be a CE, a DCI, or a RRC (Radio Resource Control) message.

Referring back to FIGS. 3 and 4, in one embodiment from the perspective of a base station that has a first string of bits to be transmitted to a first UE and a second string of bits to be transmitted to a second UE, the device 300 includes a program code 312 stored in memory 310 of the transmitter. The CPU 308 could execute program code 312 to concatenate the first string of bits and the second string of bits to form a third string of bits. The CPU could further execute program code 312 to generate a superposed signal from the third string of bits and transmits the superposed signal to the first UE and the second UE, wherein the superposed signal has an adjustable composite constellation in comparison to a first standard modulation scheme, and wherein each composite constellation point of the superposed signal has a same label-bit assignment but a different amplitude assignment in comparison to the first standard modulation scheme. The CPU could also execute program code 312 (i) to transmit a first signaling to inform the first UE about at least the adjustable composite constellation for demodulation and a specific indication of how to retrieve at least one transport block from the demodulation output for the first UE, and (ii) to transmit a second signaling to inform the second UE about at least a second standard modulation scheme for demodulation, wherein the second standard modulation scheme is different from the first standard modulation scheme.

In addition, the CPU 308 can execute the program code 312 to perform all of the above-described actions and steps or others described herein.

Figure 19:
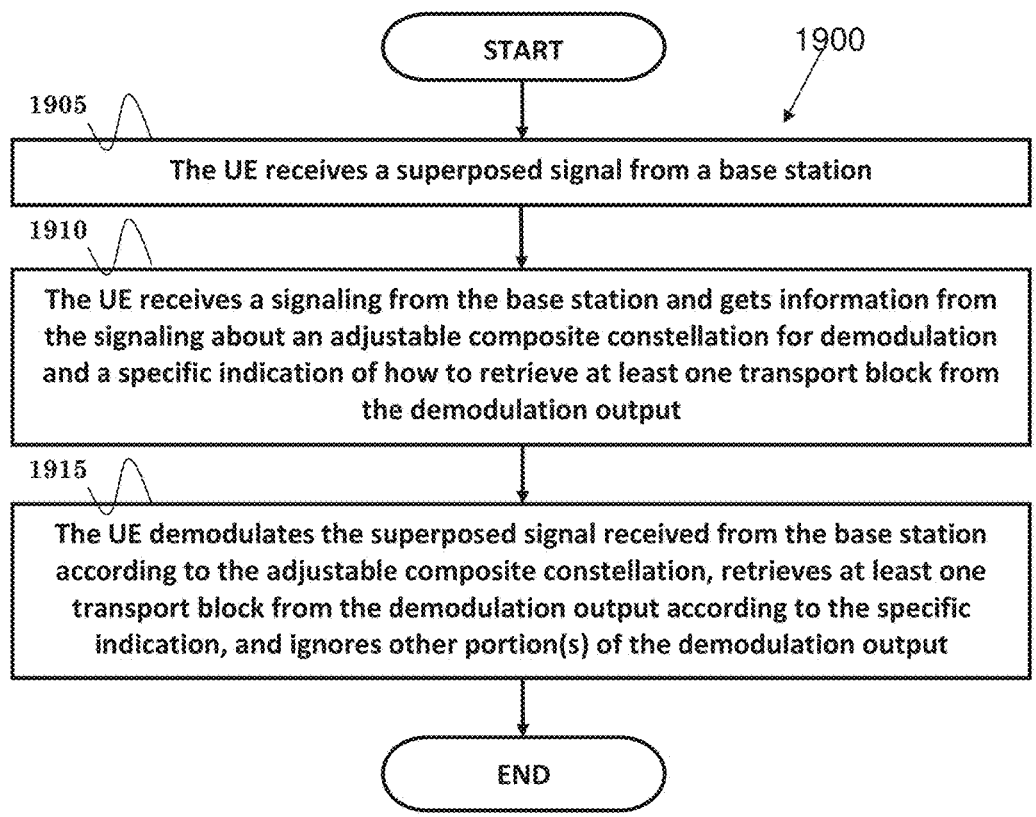
FIG. 19 is a flow chart according to one exemplary embodiment.

FIG. 19 is a flow chart 1900, from the perspective of a UE in accordance with one exemplary embodiment. In step 1905, the UE receives a superposed signal from a base station. In step 1910, the UE receives a signaling from the base station and gets information from the signaling about an adjustable composite constellation for demodulation and a specific indication of how to retrieve at least one transport block from the demodulation output. In step 1915, the UE demodulates the superposed signal received from the base station according to the adjustable composite constellation, retrieves at least one transport block from the demodulation output according to the specific indication, and ignores other portion(s) of the demodulation output.

In one embodiment, the first standard modulation scheme could be QPSK, 16 QAM, 64 QAM, or 256 QAM. The second standard modulation scheme could also be QPSK, 16 QAM, 64 QAM, or 256 QAM.

In one embodiment, the first signaling could be a CE, a DCI, or a RRC message. The second signaling could also be a CE, a DCI, or a RRC message.

Referring back to FIGS. 3 and 4, in one embodiment from the perspective of a UE, the device 300 includes a program code 312 stored in memory 310 of the transmitter. The CPU 308 could execute program code 312 (i) to receive a superposed signal from a base station (ii) to receive a signaling from the base station and gets information from the signaling about an adjustable composite constellation for demodulation and a specific indication of how to retrieve at least one transport block from the demodulation output, and (iii) to demodulate the superposed signal received from the base station according to the adjustable composite constellation, retrieves at least one transport block from the demodulation output according to the specific indication, and ignores the other portion(s) from the demodulation output. In addition, the CPU 308 can execute the program code 312 to perform all of the above-described actions and steps or others described herein.

With above embodiment(s), signaling overhead can be reduced and UE power consumption can be improved in response to service interruption or suspension of a LTE cell in unlicensed spectrum.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

The invention claimed is:

1. A method of a base station (BS), comprising:
   the base station has a first string of bits to be transmitted to a first user equipment (UE);
   the base station has a second string of bits to be transmitted to a second UE;
   the base station concatenates the first string of bits and the second string of bits to form a third string of bits;
   the base station generates a superposed signal from the third string of bits and transmits the superposed signal to the first user equipment and the second user equipment, wherein the superposed signal has a composite constellation that is the same as a first standard modulation scheme that is a Gray-mapped QPSK (Quadrature (Quaternary) Phase Shift Keying), 16 QAM (Quadrature Amplitude Modulation), 64 QAM, or 256 QAM, and wherein each composite constellation point of the superposed signal has a same label-bit assignment and a same amplitude assignment as the first standard modulation scheme;
   the base station transmits a first signaling to inform the first UE about at least the first standard modulation scheme for demodulation and a specific indication of how to retrieve at least one transport block from the demodulation output for the first UE; and
   the base station transmits a second signaling to inform the second UE about at least a second standard modulation scheme for demodulation, wherein the second standard modulation scheme is different from the first standard modulation scheme and is a Gray-mapped QPSK (Quadrature (Quaternary) Phase Shift Keying), 16 QAM (Quadrature Amplitude Modulation), 64 QAM, or 256 QAM.

2. The method of claim 1, wherein the first, second, and third strings of bits are a string of binary digits (0 or 1).

3. The method of claim 1, wherein the first signaling is a control element (CE), a downlink control information (DCI), or a RRC (Radio Resource Control) message.

4. The method of claim 1, wherein the second signaling is a control element (CE), a downlink control information (DCI), or a RRC (Radio Resource Control) message.

5. A method of a User Equipment (UE), comprising:
the UE receives a superposed signal from a base station (BS);
the UE receives a signaling from the base station and gets information from the signaling about a first standard modulation scheme for demodulation and a specific indication of how to retrieve at least one transport block from the demodulation output, wherein the first standard modulation scheme is a Gray-mapped QPSK (Quadrature (Quaternary) Phase Shift Keying), 16 QAM (Quadrature Amplitude Modulation), 64 QAM, or 256 QAM; and
the UE demodulates the superposed signal received from the base station according to the first standard modulation scheme, retrieves at least one transport block from the demodulation output according to the specific indication, and ignores other portion(s) of the demodulation output.

6. The method of claim 5, wherein the first signaling is a control element (CE), a downlink control information (DCI), or a RRC (Radio Resource Control) message.

7. A method of a base station (BS), comprising:
the base station has a first string of bits to be transmitted to a first user equipment (UE);
the base station has a second string of bits to be transmitted to a second UE;
the base station concatenates the first string of bits and the second string of bits to form a third string of bits;
the base station generates a superposed signal from the third string of bits and transmits the superposed signal to the first UE and the second UE, wherein the superposed signal has an adjustable composite constellation in comparison to a first standard modulation scheme that is a Gray-mapped QPSK (Quadrature (Quaternary) Phase Shift Keying), 16 QAM (Quadrature Amplitude Modulation), 64 QAM, or 256 QAM, and wherein each composite constellation point of the superposed signal has a same label-bit assignment but a different amplitude assignment in comparison to the first standard modulation scheme;
the base station transmits a first signaling to inform the first UE about at least the adjustable composite constellation for demodulation and a specific indication of how to retrieve at least one transport block from the demodulation output for the first UE; and
the base station transmits a second signaling to inform the second UE about at least a second standard modulation scheme for demodulation, wherein the second standard modulation scheme is different from the first standard modulation scheme and is a Gray-mapped QPSK (Quadrature (Quaternary) Phase Shift Keying), 16 QAM (Quadrature Amplitude Modulation), 64 QAM, or 256 QAM.

8. The method of claim 7, wherein the first, second, and third strings of bits are a string of binary digits (0 or 1).

9. The method of claim 7, wherein the first signaling is a control element (CE), a downlink control information (DCI), or a RRC (Radio Resource Control) message.

10. The method of claim 7, wherein the second signaling is a control element (CE), a downlink control information (DCI), or a RRC (Radio Resource Control) message.

11. A method of a user equipment (UE), comprising:
the UE receives a superposed signal from a base station (BS);
the UE receives a signaling from the base station and gets information from the signaling about an adjustable composite constellation for demodulation that is a Gray-mapped QPSK (Quadrature (Quaternary) Phase Shift Keying), 16 QAM (Quadrature Amplitude Modulation), 64 QAM, or 256 QAM, and a specific indication of how to retrieve at least one transport block from the demodulation output; and
the UE demodulates the superposed signal received from the base station according to the adjustable composite constellation, retrieves at least one transport block from the demodulation output according to the specific indication, and ignores other portion(s) of the demodulation output.

12. The method of claim 11, wherein the first signaling is a control element (CE), a downlink control information (DCI), or a RRC (Radio Resource Control) message.

13. A User Equipment (UE), comprising:
a control circuit;
a processor installed in the control circuit; and
a memory installed in the control circuit and operatively coupled to the processor;
wherein the processor is configured to execute a program code stored in the memory to:
receive a superposed signal from a base station (BS);
receive a signaling from the base station and gets information from the signaling about a first standard modulation scheme for demodulation and a specific indication of how to retrieve at least one transport block from the demodulation output, wherein the first standard modulation scheme is a Gray-mapped QPSK (Quadrature (Quaternary) Phase Shift Keying), 16 QAM (Quadrature Amplitude Modulation), 64 QAM, or 256 QAM; and
demodulate the superposed signal received from the base station according to the first standard modulation scheme, retrieves at least one transport block from the demodulation output according to the specific indication, and ignores other portion(s) of the demodulation output.

14. A User Equipment (UE), comprising:
a control circuit;
a processor installed in the control circuit; and
a memory installed in the control circuit and operatively coupled to the processor;
wherein the processor is configured to execute a program code stored in the memory to:
receive a superposed signal from a base station (BS);
receive a signaling from the base station and gets information from the signaling about an adjustable composite constellation for demodulation that is a Gray-mapped QPSK (Quadrature (Quaternary) Phase Shift Keying), 16 QAM (Quadrature Amplitude Modulation), 64 QAM, or 256 QAM, and a specific indication of how to retrieve at least one transport block from the demodulation output; and
demodulate the superposed signal received from the base station according to the adjustable composite constellation, retrieves at least one transport block from the demodulation output according to the specific indication, and ignores other portion(s) of the demodulation output.

* * * * *